US012214599B2

(12) United States Patent
Irie

(10) Patent No.: US 12,214,599 B2
(45) Date of Patent: Feb. 4, 2025

(54) ELECTRONIC EQUIPMENT, DESIGN SELECTING METHOD, AND STORAGE MEDIUM

(71) Applicant: CASIO COMPUTER CO., LTD., Tokyo (JP)

(72) Inventor: Tamotsu Irie, Higashiyamato (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 179 days.

(21) Appl. No.: 17/963,747

(22) Filed: Oct. 11, 2022

(65) Prior Publication Data

US 2023/0112304 A1 Apr. 13, 2023

(30) Foreign Application Priority Data

Oct. 12, 2021 (JP) ................................ 2021-167468

(51) Int. Cl.
*B41J 2/175* (2006.01)
*A45D 29/00* (2006.01)

(52) U.S. Cl.
CPC .......... *B41J 2/17566* (2013.01); *A45D 29/00* (2013.01); *A45D 2029/005* (2013.01); *B41J 2002/17569* (2013.01)

(58) Field of Classification Search
CPC ..... B41J 11/00; B41J 2/175; B41J 2/21; B41J 2/17566; B41J 2/17509; B41J 2/1752; B41J 2/17513; B41J 2/17503; B41J 2/17553; B41J 2/17506; B41J 2002/17573; B41M 5/00; H04N 1/60; G01F 23/292
See application file for complete search history.

(56) References Cited

U.S. PATENT DOCUMENTS

| | | | | |
|---|---|---|---|---|
| 5,900,888 A * | 5/1999 | Kurosawa | B41J 2/17566 | 347/14 |
| 2002/0118236 A1* | 8/2002 | Uetsuki | B41J 2/17566 | 347/7 |
| 2010/0028067 A1* | 2/2010 | Wanibuchi | B41J 15/04 | 400/621 |
| 2010/0066773 A1* | 3/2010 | Taga | B41J 2/1752 | 347/6 |

(Continued)

FOREIGN PATENT DOCUMENTS

| | | |
|---|---|---|
| JP | 2003-534083 A | 11/2003 |
| JP | 2015-039377 A | 3/2015 |

(Continued)

OTHER PUBLICATIONS

JPO; Application No. 2021-167468; Notice of Reasons for Refusal dated Aug. 22, 2023.

*Primary Examiner* — John Zimmermann
(74) *Attorney, Agent, or Firm* — Fitch, Even, Tabin & Flannery LLP

(57) ABSTRACT

Disclosed is an electronic equipment including: a memory in which a program is stored; and at least one processor that executes the program stored in the memory. The processor obtains ink information including information regarding a percentage of an ink remaining amount for each of a first ink and a second ink that has a color different from a color of the first ink in a print head that prints the first ink and the second ink, and selects a printing design based on the ink information.

9 Claims, 10 Drawing Sheets

(56) References Cited

U.S. PATENT DOCUMENTS

| | | | | |
|---|---|---|---|---|
| 2011/0316908 | A1* | 12/2011 | Miyagawa | B41J 2/17566 347/7 |
| 2012/0154470 | A1* | 6/2012 | Nishitani | G06K 15/1868 347/14 |
| 2015/0273855 | A1* | 10/2015 | Ishihara | B41J 2/21 347/9 |
| 2015/0312443 | A1* | 10/2015 | Miyata | H04N 1/62 358/3.24 |
| 2021/0094333 | A1* | 4/2021 | Aruga | C09D 11/328 |

FOREIGN PATENT DOCUMENTS

| | | | |
|---|---|---|---|
| JP | 2015-178216 | A | 10/2015 |
| JP | 2015-189186 | A | 11/2015 |
| JP | 2019-180610 | A | 10/2019 |

* cited by examiner

FIG.4

| |
|---|
| USER ID |
| DEVICE ID |
| CARTRIDGE ID |
| DESIGN ID AND FINGER TYPE |
| PRINTING WIDTH |
| PRINTING LENGTH |
| NUMBER OF PRINT DOTS FOR CYAN |
| NUMBER OF PRINT DOTS FOR MAGENTA |
| NUMBER OF PRINT DOTS FOR YELLOW |
| NUMBER OF NON-PRINT DOTS |

FIG.5

| |
|---|
| PRINTING OFFSET VALUE (X DIRECTION) |
| PRINTING OFFSET VALUE (Y DIRECTION) |
| PRINTING WIDTH |
| PRINTING LENGTH |
| NAIL CURVATURE LEVEL |
| NAIL INCLINATION LEVEL |
| NUMBER OF PRINT DOTS FOR CYAN |
| NUMBER OF PRINT DOTS FOR MAGENTA |
| NUMBER OF PRINT DOTS FOR YELLOW |
| PRINTING DATA LENGTH |
| PRINTING CMY OUTPUT DATA |

| CYAN | MAGENTA | YELLOW | OTHERS |
|---|---|---|---|
| 0% | 30% | 20% | 50% |

ELECTRONIC EQUIPMENT, DESIGN SELECTING METHOD, AND STORAGE MEDIUM

CROSS-REFERENCE TO RELATED APPLICATION

This application is based upon and claims the benefit of priority from the prior Japanese Patent Application No. 2021-167468, filed on Oct. 12, 2021, the entire contents of which including description, claims, and drawings is incorporated herein by reference in its entirety.

BACKGROUND

Technical Field

The present disclosure relates to an electronic equipment, a design selecting method, and a storage medium.

Background Art

Conventionally, printing devices (nail printing devices) which print designs on nails and the like are known (for example, see JP 2003-534083 A).

By using inks of respective colors, such printing devices allow users to enjoy printing various designs.

SUMMARY

According to an aspect of the present disclosure, there is provided an electronic equipment including: a memory in which a program is stored; and at least one processor that executes the program stored in the memory. The processor obtains ink information including information regarding a percentage of an ink remaining amount for each of a first ink and a second ink that has a color different from a color of the first ink in a print head that prints the first ink and the second ink, and selects a printing design based on the ink information.

BRIEF DESCRIPTION OF THE DRAWINGS

The accompanying drawings are not intended as a definition of the limits of the disclosure but illustrate embodiments of the disclosure, and together with the general description given above and the detailed description of the embodiments given below, serve to explain the principles of the disclosure, wherein:

FIG. 4 is a view showing a configuration example of printing related information transmitted to the data management server;

FIG. 5 is a view showing a configuration example of printing data transmitted to the printing device;

DESCRIPTION OF EMBODIMENTS

Hereinafter, an embodiment of the electronic equipment, the design selecting method, and the storage medium storing a program according to the present disclosure will be described with reference to FIGS. 1 to 12.

The embodiment described below is provided with various limitations technically preferable for carrying out the present disclosure. However, the scope of the present disclosure is not limited to the embodiment below or illustrated examples.

For example, the embodiment below is described by taking, as an example, a case where the data management server 8 functions as an electronic equipment which performs design presenting processing among the printing device 1, terminal device 7, and data management server 8 which cooperate with each other. However, the electronic equipment is not limited to the data management server 8.

The following description takes, as an example, a case where the printing device 1 is a nail printing device which performs printing on printing targets such as fingernails of hands. However, the printing target of the printing device in the present disclosure is not limited to the fingernails of hands. The printing target may be toenails of feet, for example. The printing target may also be other than nails such as artificial nails, and surfaces of various accessories.

[Overall Configuration]

Figure 1:
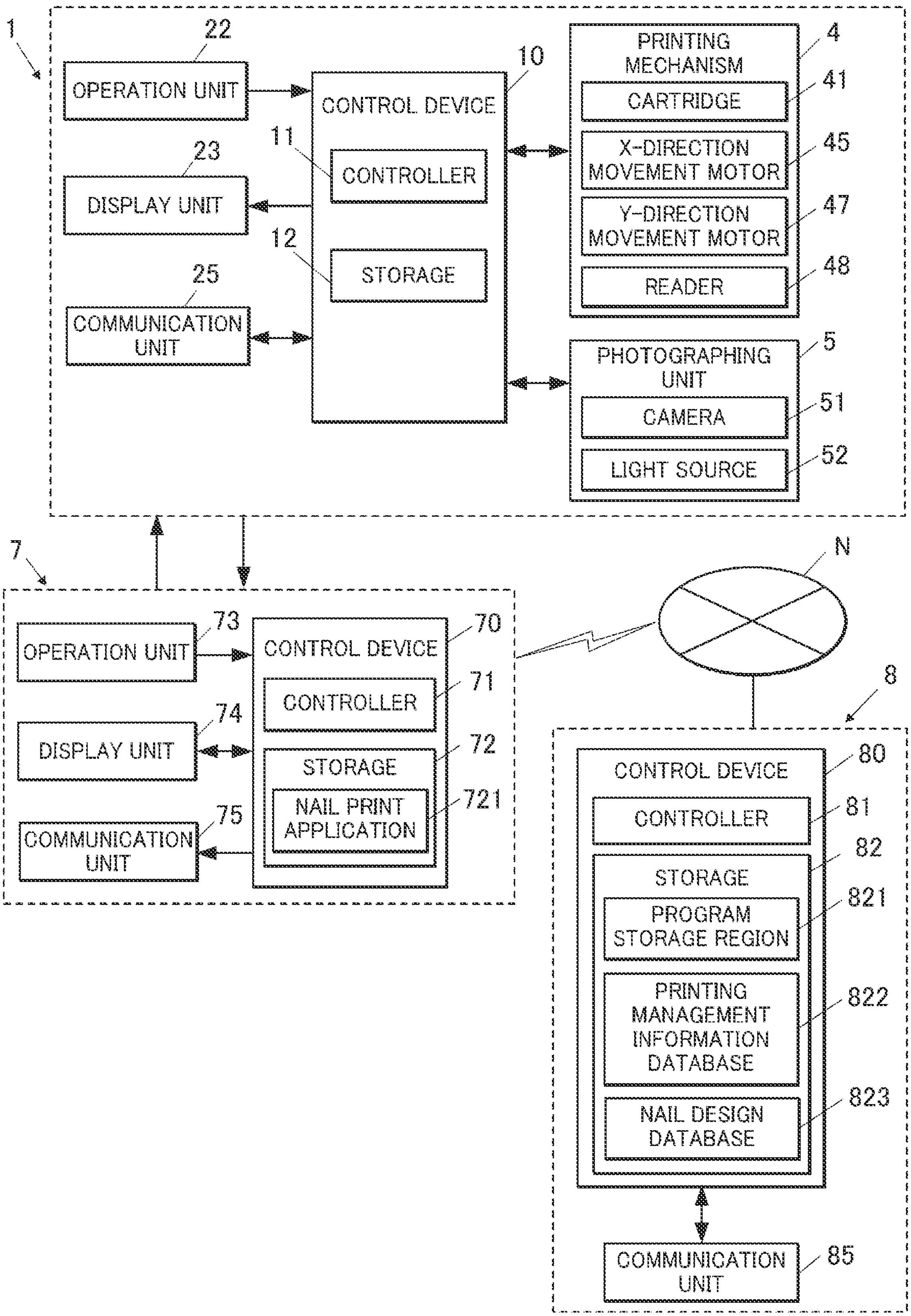
FIG. 1 is a main part block diagram showing the schematic control configuration of a printing device, a terminal device, and a data management server which cooperate with each other in an embodiment.

FIG. 1 is a main part block diagram showing the schematic control configuration of a printing device, a terminal device, and a data management server which cooperate with each other in an embodiment.

Though FIG. 1 illustrates that there is one printing device 1, one terminal device 7, and one data management server 8, multiple printing devices 1 and multiple terminal devices 7 may be connected to one data management server 8. For example, when there are multiple printing devices 1 in a single store, or there is a printing device 1 in each of multiple affiliated stores, and the like, all of the printing devices 1 may be managed by a single data management server 8.

A device ID which is a unique identification sign is assigned to each of the printing device(s) 1 in the embodiment.

The printing device 1, the terminal device 7 and the data management server 8 in the following embodiment are configured to have "normal print mode" and "eco mode" as the print mode by the printing device 1, and to switch between the two modes and realizes the mode as appropriate.

The "normal print mode" is a mode which prints the nail design desired by the user without considering the ink remaining amount, and the like. In contrast, the "eco mode" is a mode which aims to use up the inks in a cartridge 41 as much as possible without waste in consideration of ecology, and as described below, the nail design presented (suggested) to the user is switched according to the ink remaining amount (percentage of the ink remaining amount) in the cartridge 41 set in the printing device 1.

The print mode is not limited to the "normal print mode" and the "eco mode". Other modes may be available.

The switching between the "normal print mode" and the "eco mode" is performed, for example, by inputting a mode switching instruction from after-mentioned operation units 22, 73, and the like provided in the printing device 1, the terminal device 7, and the like. Either mode may be set by default. The mode may be set such that, when the ink remaining amount is detected to be low, the mode automatically switches from the "normal print mode" to the "eco mode" to restrict the nail designs presented (suggested) to the user.

The following embodiment focuses on a case where the printing device 1, the terminal device 7, and the data management server 8 operate in cooperation to print a nail design by the "eco mode".

[Configuration of Printing Device]

Figure 2:
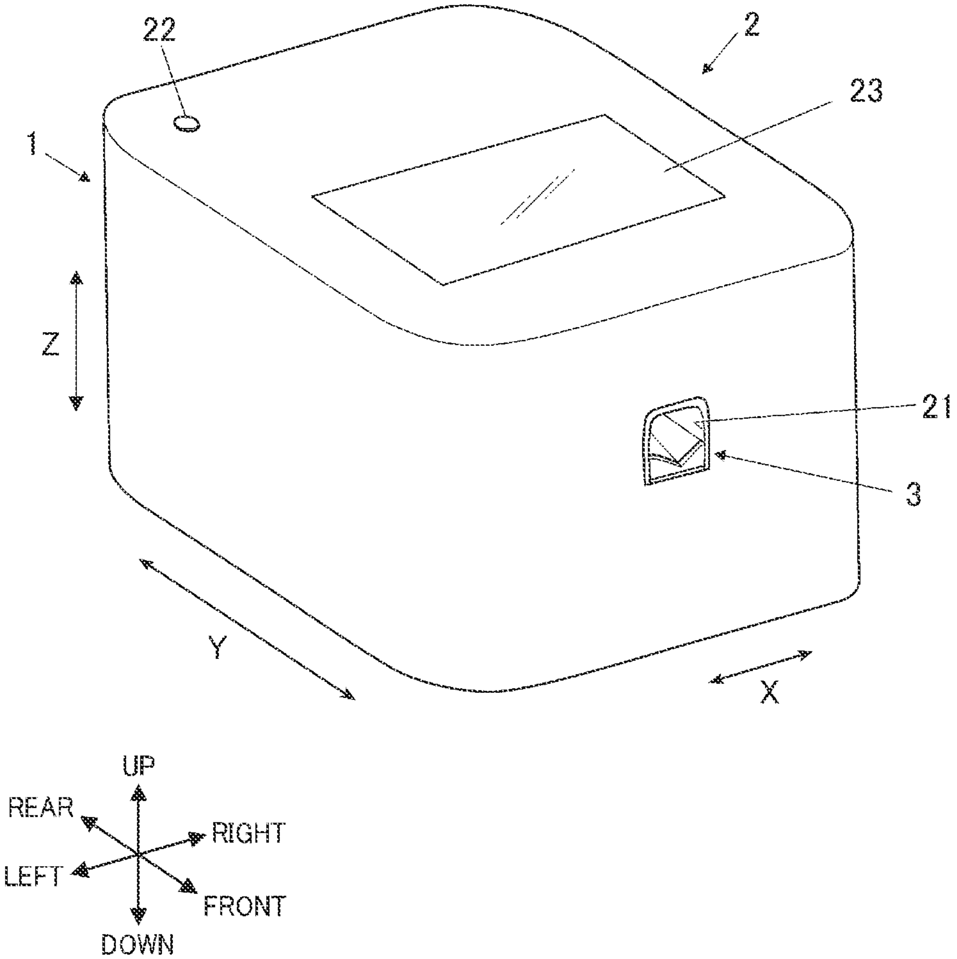
FIG. 2 is a perspective view showing the main part external configuration of the printing device in the embodiment.
Figure 3A:
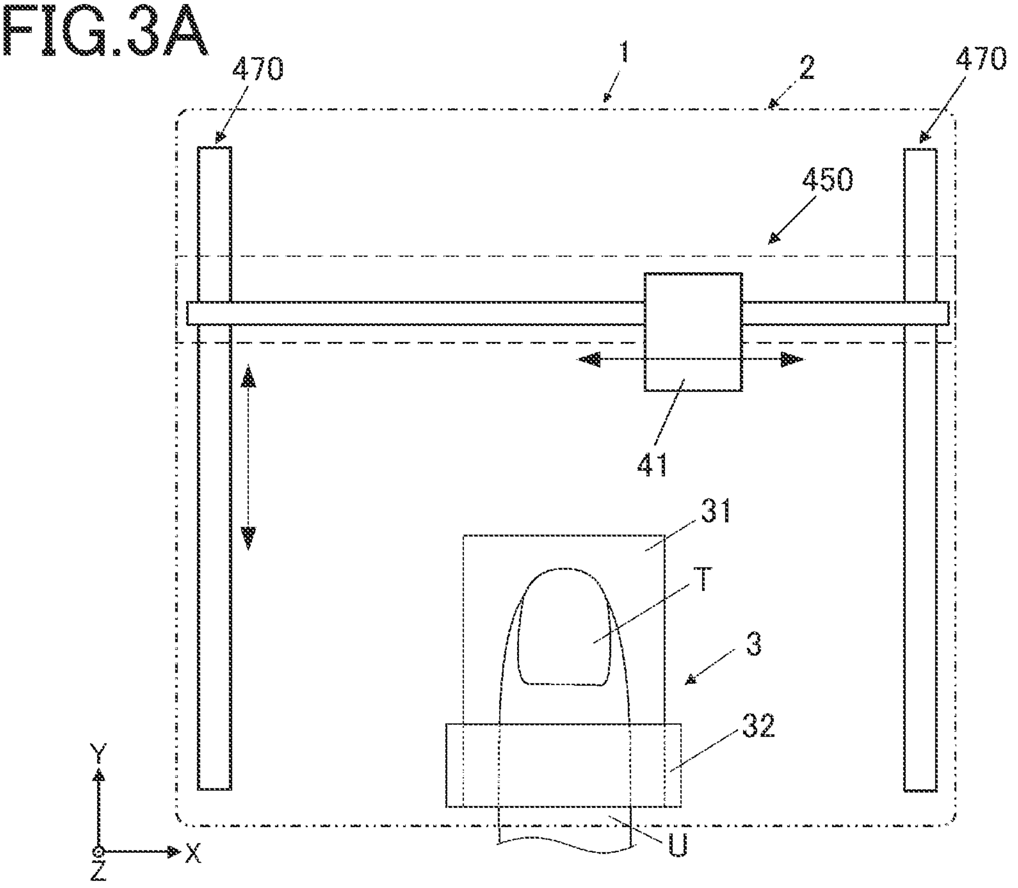
FIG. 3A is a plan view showing the internal main part configuration of the printing device, viewed from above.
Figure 3B:
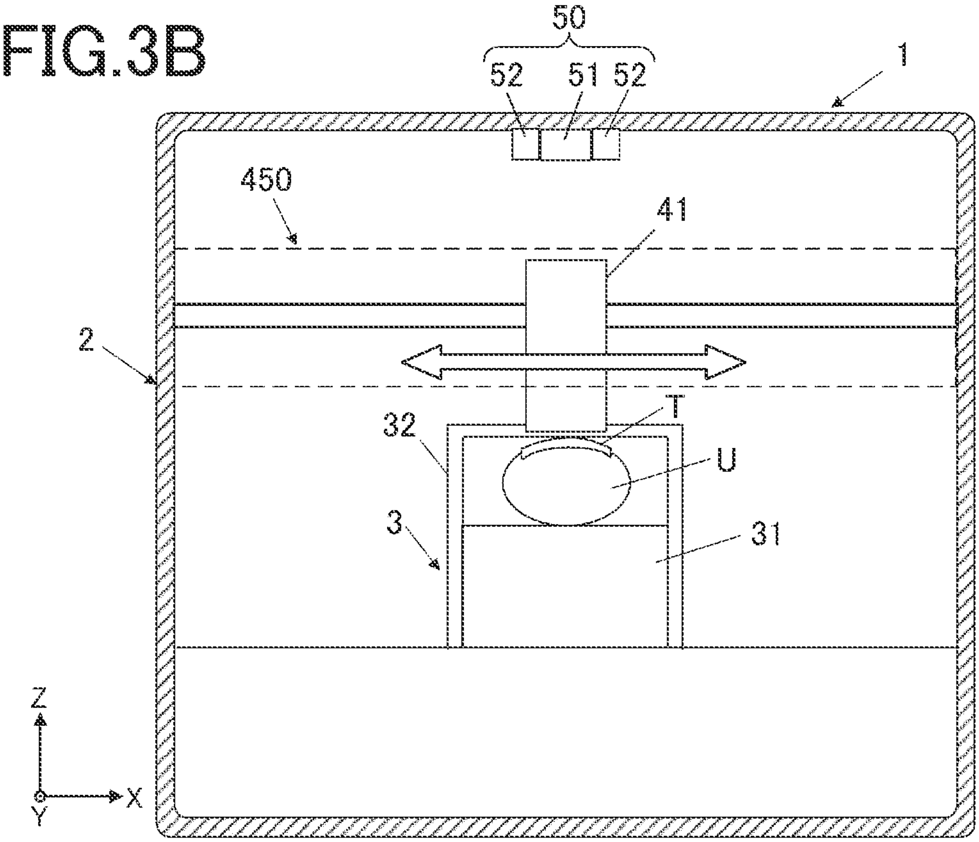
FIG. 3B is a plan view showing the internal main part configuration of the printing device, viewed from the rear side of the printing device.

FIG. 2 is a perspective view showing the main part external configuration of the printing device (nail printing device) in the embodiment. In the following embodiment, the up, down, left, right, front and rear refer to the directions shown in FIG. 2. Furthermore, the X, Y, and Z directions refer to the directions shown in FIG. 2. FIGS. 3A and 3B are plan views each showing the internal main part configuration of the printing device.

As shown in FIG. 2, the printing device 1 in this embodiment has a housing 2 which is almost box-shaped.

An opening 21 is formed on the front side of the housing 2 of the printing device 1 (front side in the Y direction in FIG. 2) approximately in the center in the left-right direction (X direction in FIG. 2) of the device. The opening 21 is a finger insertion port for inserting a finger U (see FIG. 3A and FIG. 3B) corresponding to the nail T to be the printing target into the device, and has a width and a height which are enough to allow the finger U to be inserted and removed.

In the embodiment, a finger stage 3 to place the finger U corresponding to the nail T to be the printing target is provided in the opening 21 inside the housing 2.

As shown in FIGS. 3A and 3B, the lower side of the finger stage 3 is a finger receiving section 31 which receives the belly portion of the finger U inserted through the opening 21. The finger receiving section 31 may include a cushion member formed of a material which has a flexibility such as a resin, for example.

The upper portion (at least the upper portion on the back side in Y direction in FIG. 2) of the finger stage 3 is open, so that the surface of nail T of the finger U which was inserted in the finger stage 3 is exposed.

In the embodiment, the front side of the finger stage 3 (the front side in the Y direction in FIG. 2) is provided with a frame section 32 which surrounds the upper part of the finger U. The upper side of the finger U placed on the finger stage 3 is configured to butt up against the top surface of this frame section 32. This allows the top surface of the frame section 32 to function as a finger holder which regulates the upward position of the finger U, preventing the finger U from being pushed up too far in the upward direction, and positioning the finger U in the height direction.

The height, width, and depth of the finger stage 3 should be high enough to allow stable placement of the finger U. The specific height, width, and depth of the finger stage 3 can be set as appropriate.

At least part of the finger stage 3 (for example, the finger receiving section 31 which receives the finger U) may be configured to be movable in the vertical direction.

An operation unit 22 is provided on the upper surface (top plate) of the housing 2.

The operation unit 22 is a unit for a user to perform various types of input.

The operation unit 22 is configured by including operation buttons for performing various types of input such as a power switch button to turn on/off the power of the printing device 1, a stop switch button to stop the operation, and a printing start button to instruct start of printing, for example.

The operation unit 22 can switch the print mode of the printing control processing realized by the cooperation of the printing device 1, the terminal device 7, and the data management server 8 between the "normal print mode" and the "eco mode". The operation unit 22 may input mode switching instructions.

When the operation unit 22 is operated, the operation signal according to the operation is output to a controller 11 of a control device 10. The controller 11 performs control in accordance with the operation signal to operate the components of the printing device 1.

A display unit 23 is arranged on the upper surface of the housing 2.

The display unit 23 consists of, for example, a liquid crystal display (LCD), an organic electroluminescent display (organic ELD), or any other display (flat display). The display unit 23 displays various types of images and information on a display on the basis of the display signal input from the controller 11 to be described later.

The display of the display unit 23 in the embodiment may be integrally formed with the touch panel. In this case, the touch panel also functions as the operation unit 22 which accepts the touch operation by the user and performs various types of input.

As shown in FIG. 1, the printing device 1 includes a printing mechanism 4, a photographing unit 5, a communication unit 25 and the control device 10 in addition to the operation unit 22 and the display unit 23 described above.

The printing mechanism 4 includes a housing unit which accommodates the cartridge 41, and an X-direction movement motor 45 and a Y-direction movement motor 47 (see FIG. 1) to move the cartridge 41. The printing mechanism 4 performs printing using the cartridge 41.

In the embodiment, the cartridge 41 is a print head which incorporates ink reservoirs (not shown in the drawings) and is integrally equipped with an ink ejection mechanism (not shown in the drawings) of the inkjet method which ejects an ink in the ink reservoir as fine droplets to print on the surface to be printed.

The surface facing the surface to be printed (in this embodiment, the surface of the nail T) in the cartridge 41 has an integrated ink ejection surface. The ink ejection surface has rows of ejection ports of nozzle arrays (nozzle ports, ink ejection ports, not shown in the drawings) consisting of a multiple nozzles which inject inks of respective colors.

The controller 11 which functions as a printing controller controls the ink ejection mechanism to eject a predetermined ink from the nozzle port as appropriate to perform printing.

The cartridge 41 as the print head is not limited to the cartridge having the configuration illustrated here. For example, the cartridge may have only the ink reservoirs, and may be connected to a separate ink ejection mechanism when the cartridge is used for printing. The specific configurations for performing printing such as the configuration of the cartridge 41 to eject ink are not particularly limited.

The cartridge 41 as a print head ejects a first ink, and a second ink of a different color from the color of the first ink. The types of the first ink and the second ink in the cartridge 41 mounted on the printing mechanism 4 are not particularly limited. The inks are not limited to two types of inks, but may be three types or more of inks.

The cartridge 41 provided in the printing mechanism 4 in the embodiment has the ink reservoirs corresponding to the color inks of cyan (C), magenta (M), and yellow (Y), for example. The cartridge 41 is the cartridge 41 for design printing which performs color printing of the design (nail design).

The cartridge 41 in the embodiment integrally includes the multiple ink reservoirs which store the inks of respective colors. The ink remaining amount in the cartridge 41 is grasped for each color of ink in the data management server 8. The ink remaining amount of each color can be calculated by subtracting the ink amount for the number of dots of the color output in the printing, from the ink storage amount of the ink in the cartridge 41 in the initial state (that is, before start of use). In this respect, in the embodiment, the number of print dots for each color is transmitted to the data management server 8 via the terminal device 7 as information regarding the percentage of the ink remaining amount for each of the inks of multiple types of colors (inks of cyan, magenta and yellow as "the first ink, the second ink . . . ").

When the data management server 8 determines that the ink remaining amount for even one of the multiple colors of inks has reached an unprintable level ("warning level" described below), the printing device 1 and terminal device 7 are notified of this fact, and a warning message is displayed on the display unit 23 and the like, urging to replace the cartridge 41.

It is assumed that the amount of ink stored in cartridge 41 in the initial state may be different for each color. Even in such a case, by managing information regarding the "percentage" of the ink remaining amount, it is possible to make a relative comparison of the degree of decrease for each ink.

In addition to the cartridges 41 for design printing as described above, the printing mechanism 4 may be equipped with a cartridge for base printing, for example, to form a white or other color (white, or pink or blue close to white) base on the nail T before printing the design. The cartridge for base printing has an ink reservoir storing the base ink therein.

When printing on a nail T of a finger U, applying a base ink to the nail T before printing a design (nail design) using color inks for design can improve the coloring of the color inks and the like, and enable printing (nail printing) with a beautiful finish.

In this embodiment, the cartridge 41 is movable in the left-right direction (X direction) and front-rear direction (Y direction) of the device. The X-direction movement motor 45 constitutes an X-direction movement mechanism 450 (see FIGS. 3A and 3B) which moves the cartridge 41 in the X direction, and the Y-direction movement motor 47 constitutes a Y-direction movement mechanism 470 (see FIG. 3A) which moves the cartridge 41 in the Y direction. The X-direction movement motor 45 and the Y-direction movement motor 47 are stepping motors, for example.

The printing mechanism 4 has a position detection sensor (origin sensor, encoder sensor, and the like) not shown in the drawings. The controller 11 to be described later performs control to move the cartridge 41 in the X direction and the Y direction as appropriate, while accurately grasping the position of the cartridge 41 on the basis of the output information from the sensor.

Furthermore, a unique cartridge ID is assigned to each of the cartridges 41 in the embodiment. The printing device 1 has a reader 48 (see FIG. 1) which reads the cartridge ID on the mounting portion of the cartridge 41, and the like.

The cartridge ID is identification information for identifying each individual cartridge 41. For example, the cartridge ID is the ID (identification number) which was assigned to the individual cartridge 41 when the cartridge 41 was manufactured. The cartridge ID is data of symbols, for example, numbers, alphabets and the like, alone or in combination, and is stored in a memory chip in the cartridge 41. The reader 48 is equipped with a device capable of reading the cartridge ID of each individual cartridge 41 by decoding the data encoded with the cartridge ID, which is stored in the memory chip. The cartridge ID may also be given in the form of a bar code, QR code (registered trademark), and the like. In this case, the reader 48 is equipped with a sensor or other device capable of reading them. The cartridge ID assigned to the cartridge 41 is only required to be able to identify the cartridge 41, and its format is not particularly limited. As the reader 48, the device capable of reading the cartridge ID assigned to the cartridge 41 is applied.

The photographing unit 5 includes a camera 51, and a light source 52.

The camera 51 is for obtaining the image of nail T which is the printing target by photographing the nail T of the finger U placed on the finger stage 3.

The light source 52 is an illumination lamp, such as a white LED, for example.

The camera 51 of the photographing unit 5 obtains the nail image (not shown in the drawings) by photographing the nail T which is the printing target or the finger U including the nail T. In the embodiment, the data of the nail image obtained by the camera 51 is transmitted to the terminal device 7 which is the external device to be described later, and the controller 71 of the terminal device 7 detects the nail outline defining the nail region which is the printing region from the nail image, for example.

The communication unit 25 communicates with the external device. The "external device" in the embodiment is the terminal device 7 to be described later and the like.

In the embodiment, the nail image photographed by the photographing unit 5 is transmitted from the printing device 1 to the terminal device 7 which is the external device, and the printing device 1 obtains the printing data for printing the design (nail design) on the nail T from the terminal device 7 and the like. The communication unit 25 performs transmission and reception of information with the terminal device 7 and the like. The external device is not limited to the terminal device 7, but may be various devices such as the data management server 8.

The communication between the printing device 1 and the terminal device 7 and the like is performed by a wireless LAN, for example. The communication between the printing device 1 and the terminal device 7 and the like is not limited to this, and any method may be adopted. For example, network lines such as internet may be used, or wireless communication based on the short-range wireless communication standards such as Bluetooth (registered trademark) and Wi-Fi may be used. This communication is not limited to the wireless connection method, and transmission and reception of various types of data between them may be performed by wired connection. The communication unit 25 includes an antenna chip and the like corresponding to the communication method or communication standard of various external devices expected to communicate with the communication unit 25.

The control device 10 mounted on the printing device 1 is a computer which includes: a controller 11 configured by including at least one processor such as a CPU (Central Processing Unit) not shown in the drawings; and a storage 12 configured by including a ROM (Read Only Memory), a RAM (Random Access Memory) as at least one memory not shown in the drawings, and the like.

The storage 12 stores various programs for operating the printing device 1, and various types of data in the ROM, for example.

The operation of components of the printing device 1 are integrally controlled by the controller 11 loading and executing the various programs stored in the ROM and the like into the working area of RAM.

That is, the controller 11 realizes various functions for the printing device 1 to perform printing processing and other processing by the cooperation with the program (for example, printing processing program).

The controller 11 in the embodiment mainly controls the operation of display unit 23, the operation of the components in the printing mechanism 4, the operation of the components in the photographing unit 5, and the operation of the communication unit 25.

That is, the controller 11 generates display data to be displayed on the display of the display unit 23, and outputs the display data to the display unit 23. For example, the controller 11 generates the image data for displaying the nail image obtained by the photographing unit 5, the display data for displaying the design (nail design) on the display unit 23, and the display data for displaying various message screens, guidance screens, error display screens, and the like on the display of the display unit 23.

The controller 11 controls the operation of the printing mechanism 4. To be specific, the controller 11 controls the ink ejection mechanism in accordance with the printing data to eject the ink as appropriate. The controller 11 as the printing controller grasps the position of the cartridge 41 according to the output from the position detection sensor, and operates the X-direction movement motor 45 and the Y-direction movement motor 47 to move the cartridge 41 in X and Y directions as appropriate.

The controller 11 controls the operation of the camera 51 and the light source 52 of the photographing unit 5 to illuminate the nail T and the area around the nail T with the light source 52 and obtain the nail image and the like with the camera 51.

The controller 11 controls the communication unit 25 to communicate with the communication unit 75 of the terminal device 7, transmit the identification information of the cartridge 41 mounted on the device, data of the nail image, and the like to the terminal device 7, and receive the printing data, various operation instructions, and the like from the terminal device 7.

In the embodiment, the printing device 1 operates by receiving various instructions such as the instruction to start printing from the terminal device 7. The controller 11 of the printing device 1 receives these instructions via the communication unit 25. When the instruction is received from the terminal device 7 and the like, the controller 11 causes the components of the device to perform the operation according to the instruction.

In the case where an external device such as the terminal device 7 performs selection of design (nail design), detection of nail outline from the nail image, generation of the printing data, and the like, the controller 11 controls the communication unit 25 to receive the data of the selected design, the detected nail outline, the generated printing data, and the like, from the external device such as the terminal device 7.

The nail design (design data) in the embodiment also includes information regarding the color scheme. That is, designs with the same pattern but different color schemes are treated as different designs (nail designs).

[Configuration of Terminal Device]

The terminal device 7 is, for example, a mobile type terminal device such as a smartphone, a tablet type terminal device (hereinafter, "tablet PC (personal computer)"), and a mobile phone. The terminal device 7 is not limited to such a mobile type terminal device. For example, the terminal device 7 may be a notebook PC, a desktop PC, and the like.

As shown in FIG. 1, the terminal device 7 includes a control device 70, an operation unit 73, a display unit 74, a communication unit 75, and the like.

The operation unit 73 can perform various inputs, settings and the like according to user operations. The operation unit 73 is, for example, a touch panel which is integrally provided with the display (not shown in the drawings) of the display unit 74 to be described later.

In the embodiment, the operation unit 73 may input a mode switching instruction to switch the print mode of the printing control processing realized by the cooperation between the printing device 1, the terminal device 7, and the data management server 8.

When the operation unit 73 is operated, the input signal corresponding to the operation is transmitted to the controller 71, and the controller 71 performs control according to the operation signal.

The display unit 74 includes, for example, a display (flat display) such as a liquid crystal display. The display unit 74 displays, on the display, the various types of images and information, message screens, and the like based on the display signal input from the controller 71.

The display of the display unit 74 in the embodiment is integrally formed with the touch panel, and various types of operation screens are displayed on the touch panel in accordance with the control by the controller 71. The user can perform operations of various inputs, settings and the like by the touch operation to the touch panel. The touch panel accepts the touch operation by the user, and functions as the operation unit 73 which performs various inputs. The operation unit 73 which performs the operations of various inputs, settings and the like is not limited to the touch panel.

In the embodiment, the terminal device 7 can be connected to the network N, and has the communication unit 75 capable of network connection.

In the embodiment, the communication unit 75 transmits the printing related information (see FIG. 4) including "ink information" to the data management server 8 to be described later.

In the embodiment, the communication unit 75 accepts the transmission of the list of nail designs (nail design list, see FIG. 8) from the data management server 8, and receives the presentation of nail designs (also simply referred to as "designs").

When the print mode is "normal print mode", a nail design list, which is a list prioritizing nail designs and the like which were selected in the past by the user identified by the user ID and the like, is transmitted from the data management server 8.

In contrast, when the print mode is "eco mode", list data of nail designs which are recommended by taking into account the ink remaining amount and the like is transmitted from the data management server 8 as a nail design list.

The nail design list is not limited to the list indicating multiple nail designs, but may be a list presenting a single nail design.

The nail designs are stored in a nail design database 823 in a storage 82 of the data management server 8. When the data delivery is requested to the data management server 8 from the terminal device 7, the data of the nail design (original printing data PD of the nail design) is delivered via the communication unit 75 as appropriate.

The terminal device 7 accepts various types of information from the external device such as the printing device 1, and outputs the data (printing data) of the design (nail design) to be printed on the nail T to the printing device 1. The terminal device 7 performs data transmission and reception with the printing device 1 and the like by wireless communication based on the short-range wireless communication standards such as Bluetooth (registered trademark) and Wi-Fi, and communication by wireless LAN, communication by wired connection. The terminal device 7 includes the communication unit 75 which treats such communication.

The specific communication method and the like are not particularly limited. The communication method and the like may be selected as appropriate from among several communication methods.

The control device 70 is a computer including a controller 71 which has at least one processor such as a CPU not shown in the drawings, a storage 72 which has a ROM, RAM, and the like (not shown in the drawings) as at least one memory, and the like. The storage 72 stores various programs, various types of data, and the like for operating the components of the terminal device 7.

The controller 71 reads out the specified program from among the system programs and application programs stored in the storage 72, loads them to the working area of the RAM, and executes various types of processing in accordance with the programs, to control the components of the terminal device 7.

In particular, in the embodiment, the storage 72 stores the nail print application program 721 (hereinafter, referred to as "nail print application"), and the controller 71 realizes various functions regarding nail print using the printing device 1 by the cooperation with such programs.

To be specific, the controller 71 functions as a display controller which controls the operation of the display unit 74, the communication controller which controls the operation of the communication unit 75, and the like.

In particular, in the embodiment, when the printing by the printing device 1 is finished, the controller 71 as the communication controller transmits the "printing related information" for the printing to the data management server 8 from the terminal device 7.

FIG. 4 is a view showing an example of the printing related information.

As shown in FIG. 4, the "printing related information" includes, for example, the user ID which is the identification sign unique to the user, the device ID, the cartridge id, the design ID which is the identification sign unique to the design (nail design), and the finger type of the nail T to print the design (that is, right or left hand, or thumb, index, middle, ring, or little finger). Furthermore, the "printing related information" includes information on the printing width, the printing length, the number of print dots for cyan, the number of print dots for magenta, the number of print dots for yellow and the number of non-print dots, and the like. The "printing related information" may include information other than these information illustrated here, or may not include part of them.

The "number of non-print dots" is a total number of non-print dots for which the color ink is not actually ejected.

The nail design data (original printing data PD shown in FIG. 6, printing data generated by fitting the original printing data PD to the shape of nail T of the user) is rectangular data expressed by "printing width"×"printing length". In the data, the region in the nail frame corresponding to the region of nail T is the printing target region ArT, and the region outside the nail frame is the non-target region ArN.

Though the non-target region ArN is included in the nail design data (original printing data PD, and the like), the non-target region ArN is not the region of printing target. Thus, the print dot of color ink is not assigned. The non-print dot is assigned to such a non-target region ArN.

Even within the printing target region ArT, there may be design regions Ed1, Ed2 where the design is to be printed and non-design region Nd where the design is not to be printed, depending on the nail design. For example, as in the example shown in FIG. 6, in the case of French nails arranging the design only on the tip of the nail T, the area other than the tip of the nail is the non-design region Nd. In the case of a design in which a one-point pattern is printed on a part of the nail T, the area other than the one-point pattern is the non-design region Nd. The non-print dot is also assigned to such non-design regions Nd.

Furthermore, even within design regions Ed1 and Ed2, there may be areas where many dots are stacked on top of each other to express shades of color, and areas where gaps are daringly left between dots. For example, if the number of dots specified for the nail design data (original printing data PD, and the like) is based on the premise that four dots are overlaid in each location, in the design region Ed1, which is printed in a relatively dark shade, the color ink dot is assigned to all four dots to be overlaid. In the design region Ed2, which is printed in a relatively light shade, the color ink dot is assigned to one or two of the four dots to be overlaid, and the non-print dot for which the ink is not actually ejected is assigned to the remaining dots.

The controller 71 obtains the nail image transmitted from the printing device 1, and obtains various types of information regarding the nail T based on the nail image. For example, the controller 71 performs the nail recognition (that is, detection of the region of nail T). The specific method of recognizing (detecting) the region of nail T (nail region) from the nail image is not particularly limited. For example, the controller 71 detects the nail outline defining the nail region based on the difference of luminance, and the like by analyzing the nail image. In the case where the curvature level and the inclination level (curve degree in the nail width direction and inclination degree of nail T) of the nail T can be detected from the nail image, these are also detected.

Furthermore, the controller 71 in the embodiment generates the printing data for performing printing in the printing device 1 by fitting the original printing data PD (see FIG. 6) of the nail design to the nail outline of the user recognized from the nail image. In the case where the curvature level and the inclination level of the nail T are detected from the nail image, the controller 71 generates the printing data by also performing necessary amendments such as curved surface correction according to the detection of them.

FIG. 5 is a configuration example of printing data generated in the terminal device.

The printing data is data for the printing device 1 to perform printing processing. The printing data is transmitted from the terminal device 7 to the printing device 1. The printing data transmitted to the printing device 1 is dot-patterned data for the inks of respective colors which are cyan (C), magenta (M), and yellow (Y).

As illustrated in FIG. 5, the printing data includes information on the offset coordinate values as the printing start positions in the X direction and the Y direction, the printing width, the printing length, the curvature level indicating the degree of curved surface in the horizontal direction (width direction) of the nail T, and the inclination level indicating the upward or downward inclination in the length direction of the nail T. The printing data includes the information on the number of output (print) dots for cyan, the number of output (print) dots for magenta, and the number of output (print) dots for yellow. The printing data is configured by including the CMY printing data length, bit-patterned CMY output data to be printed, and the like.

The configuration of printing data is not limited to the illustrated example.

[Configuration of Data Management Server]

The data management server 8 is a server which manages the printing device 1 via the terminal device 7 connected to the network N, and is an electronic equipment in the embodiment.

When executing printing in the "eco mode" as the print mode, the data management server 8 grasps the status of the ink remaining amount of the cartridge 41 in the printing device 1 and the like, and presents (suggests) nail designs corresponding to the ink remaining amount (percentage of the ink remaining amount) to the user. To be specific, the data management server 8 transmits, to the terminal device 7 and the like, the nail design list picking up the nail designs corresponding to the ink remaining amount (percentage of the ink remaining amount). The terminal device 7 presents candidates of nail designs to the user by performing list display and the like based on the transmitted list on the display unit 74.

The printing device 1 for which the status of the ink remaining amount and the like is managed by the data management server 8 is assumed to be, for example, a printing device which was installed in affiliated or mutually linked stores (affiliated nail salons, beauty salons, and the like), but the printing device 1 is not limited to this.

As shown in FIG. 1, the data management server 8 includes a control device 80, a communication unit 85, and the like.

The control device 80 is a computer including a controller 81 which has at least one processor such as a CPU not shown in the drawings, a storage 82 which has a ROM, RAM, and the like (not shown in the drawings) as at least one memory, and the like.

The storage 82 includes a program storage region 821 which stores various programs for the controller 81 to perform data management processing and the like, and stores various types of information necessary to perform processing.

The storage 82 also includes a printing management information database ("printing management information database 822" in FIG. 1), and a nail design database ("nail design database 823" in FIG. 1).

In the embodiment, the "printing related information" (see FIG. 4) is transmitted to the data management server 8 from the terminal device 7 which cooperates with the printing device 1. The data management server 8 stores all or part of this "printing related information" in the printing management information database 822 as the "printing management information" regarding the printing device 1 to manage the status of the ink remaining amount of the cartridge 41 and the like.

The "printing management information" here is, for example, information including the device ID, the cartridge ID, the "ink information" associated with the cartridge ID, and the like.

The "ink information" includes "information regarding a percentage of an ink remaining amount" for each of multiple colors of inks (inks of cyan, magenta, and yellow as "first ink, second ink . . . ") stored in the cartridge 41. The "information regarding a percentage of an ink remaining amount" may be any information. In the embodiment, the "information regarding a percentage of an ink remaining amount" is information which enables to calculate and estimate the ink remaining amount, for example, the information on the total number of print dots for cyan used in the printing, the total number of print dots for magenta, and the total number of print dots for yellow. The "information regarding a percentage of an ink remaining amount" may be information on the ink remaining amount itself when the ink remaining amount itself stored in the cartridge 41 can be detected.

The total number of print dots is, for example, the cumulative number of print dots for each ink in the cartridge 41 identified by the cartridge ID. The ink remaining amount is calculated by subtracting the ink amount corresponding to the total number of print dots from the ink storage amount in the cartridge 41 in the initial state, for example.

When the "printing related information" is transmitted to the data management server 8 from the terminal device 7, the controller 81 of the data management server 8 updates information in the printing management information database 822 as appropriate. That is, in the printing processing which was newly executed by using the cartridge 41, when the total number of print dots (cumulative number of print dots) for each color of ink in the cartridge 41 has increased, the controller 81 re-calculates the ink remaining amount for each color of ink associated with the cartridge ID of the cartridge 41 and rewrites the information to the latest information.

The data of multiple nail designs is stored in the nail design database 823. The data of nail designs stored in the nail design database 823 may be replaced with new data or new data may be added as appropriate.

When the delivery is requested by the terminal device 7 and the like, the controller 81 of the data management server 8 extracts the data (original printing data PD) of the requested nail design from the nail design database 823, and delivers (transmits) the extracted data to the requesting device as appropriate.

Figure 7:
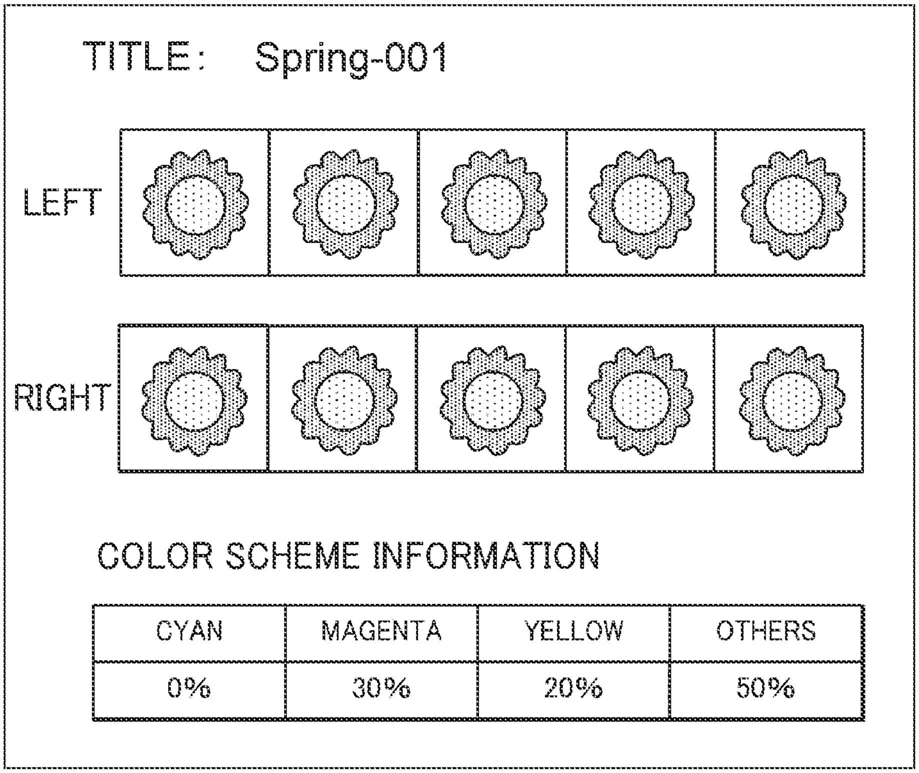
FIG. 7 is a view showing an example of a nail design.

FIG. 7 is a view showing an example of nail design displayed on the display unit of the terminal device which received delivery of the nail design and the display unit of the printing device which cooperates with the terminal device.

When the nail design is displayed on the display unit 74 of the terminal device 7 and the display unit 23 of the printing device 1, as shown in FIG. 7, for example, the title name of the design (in the example shown in FIG. 7, "TITLE: Spring-001"), five designs for the left hand and five designs for the right hand are displayed side by side. In the illustrated example, all the designs are the same, but they may be different for each hand and each finger.

The original printing data PD is created in the form of design materials (for example, two lines in the French nail example shown in FIG. 6, a floral pattern in the one-point pattern example shown in FIG. 7) arranged to fit a standard nail frame (for example, vertical oval, and the like).

As mentioned above, the nail design (design data) in the embodiment also includes information regarding the color scheme ("color scheme information"). That is, even if the same pattern is used, designs with different color schemes are considered different designs (nail designs), and in the design presenting processing to be described later, it is possible to present different color designs with only the color scheme changed according to the ink remaining amount (percentage).

The "color scheme information" here indicates the percentage of the number of print dots for each of the cyan ink, magenta ink, and yellow ink in the case of forming the printing data to the original printing data PD in the rectangular form surrounding the standard nail frame with the standard curvature level and inclination level of the nail T. The "others" is the percentage of the number of non-print dots which are assigned to the portion to which the print dot for each color of ink is not assigned. As mentioned above for FIG. 6, only the non-print dot is assigned to the region outside the standard nail frame (non-target region ArN in IG 6). Even in the region within the standard nail frame (printing target region ArT in FIG. 6), only the non-print dot is assigned to the non-design region Nd. In the design region Ed1 with a dark color scheme, the percentage of non-print dot is low and a large number of colored ink dots are output. In contrast, the number of color ink dots printed in the design region Ed2, which has a light color scheme, is small and the percentage of non-print dot is high.

As described later, the controller 81 of the data management server 8 performs presentation of the nail designs (specifically, creation of nail design list and transmission of the list in the embodiment) according to the ink remaining amount (percentage of the ink remaining amount) for each ink as the "ink information" on the basis of the "color scheme information" included in the data of each nail design (original printing data PD).

Since the "color scheme information" is set on the basis of the standard nail frame and the like as described above, at the stage of generating the printing data to match the nail T of the user that actually performs printing, there may be a slight deviation in the percentage of each color. However, since no significant differences occur, this deviation shall not be specifically considered in the presentation of the nail design.

The controller 81 controls the components of the data management server 8. The controller 81 reads the specified programs from among the programs stored in the storage 82, loads them to the working area in the RAM and executes various types of processing in accordance with the programs.

In particular, the controller 81 in the embodiment realizes the following functions by the cooperation with the programs.

That is, the controller 81 obtains the "ink information" for the cartridge 41 included in the printing device 1.

As mentioned above, the "ink information" includes the information regarding the percentage of the ink remaining amount such as the information on the number of print dots for each color ink.

In the embodiment, after printing of nail design by the printing device 1 is finished, the "printing related information" including the "ink information" is transmitted to the data management server 8 from the terminal device 7 which cooperates with the printing device 1. Thus, the controller 81 obtains the "ink information".

In addition, the controller 81 presents designs (nail designs) on the basis of the "ink information" such as the information regarding the percentage of the ink remaining amount.

To be specific, the controller 81 specifies the color to be used with priority for the design (nail design) on the basis of the information regarding the percentage of the ink remaining amount, and selects (presents) the designs (nail designs) on the basis of the specified color.

Though the method of presenting the designs (nail designs) is not particularly limited, in the embodiment, the controller 81 creates the nail design list (for example, see FIG. 8) by extracting the designs (nail designs) using the specified color with priority from the nail design database 823, and transmits the nail design list to the device which has accessed the data management server 8 such as the terminal device 7.

In the creation of nail design list, the selection criteria in the controller 81 changes depending on the remaining degree of the ink in the cartridge 41, and a list is prepared recommending designs which will give priority to the use of the remaining color ink.

The number of designs (nail designs) to be listed on the nail design list and in what format they will be transmitted are matters to be set as appropriate.

Figure 8:
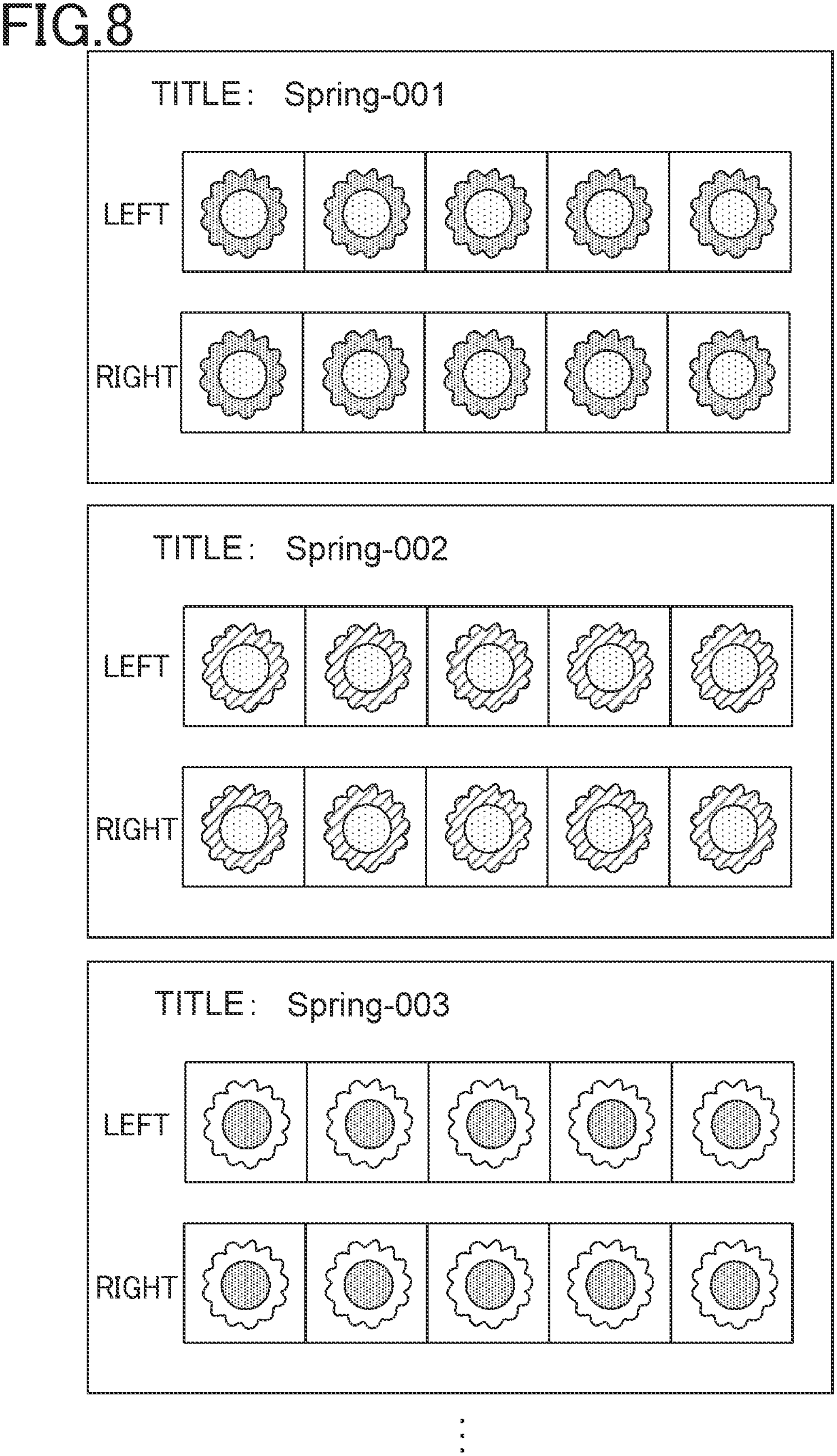
FIG. 8 is a view showing an example of a nail design list.

The nail design list is distributed, for example, in a format which allows multiple nail designs to be displayed in a vertical line on the display unit 74 of the terminal device 7, as shown in FIG. 8. The nail design list can be in any format, including a format which allows selection from the displayed list, selection by scrolling vertically or horizontally, or selecting from multiple slides.

In the case where the terminal device 7 has transmitted information including the user ID and the like when accessing the data management server 8, for example, when the level of use of the identified colors is the same degree, designs that the user identified by the user ID has selected in the past, designs similar to these, or designs belonging to similar categories (for example, "flowers," "animals," and the like) may be listed with priority at the top of the list.

In the embodiment, a threshold is set in advance for the ink remaining amount. When there is an ink having the ink remaining amount less than the threshold, the controller 81 specifies the color other than the color of the above ink as the color to be used with priority for the design (nail design), and presents the designs (nail designs) on the basis of the specified color.

The method for determining the threshold is not limited, but for example, there are set two levels of thresholds: a warning level which is the ink remaining amount of the level at which printing is not recommended, and a monitoring level which is the ink remaining amount of the level at which use should be avoided as much as possible. The degree of value of each threshold is determined as appropriate.

When the "printing related information" including the "ink information" is newly transmitted from the terminal device 7 and the like, the controller 81 updates the contents of the printing management information database 822 on the basis of the information as needed. That is, by the printing being performed, the ink of each color is output (ejected), and this information is transmitted as the "printing related information". The controller 81 calculates the ink remaining amount for each color by subtracting the output (ejected) ink amount from the ink remaining amount for each color on the basis of the "printing related information", stores the calculated amount as the "printing management information" in the printing management information database 822 and rewrites the contents of the printing management information database 822 to a the latest state.

[Operations of Printing Device, Terminal Device, and Data Management Server]

Next, with reference to FIGS. 9 to 12, the operations of the printing device 1, the terminal device 7 and the data management server 8, and the design presenting method by the controller 81 of the data management sever 8 in the embodiment will be described.

Figure 9:
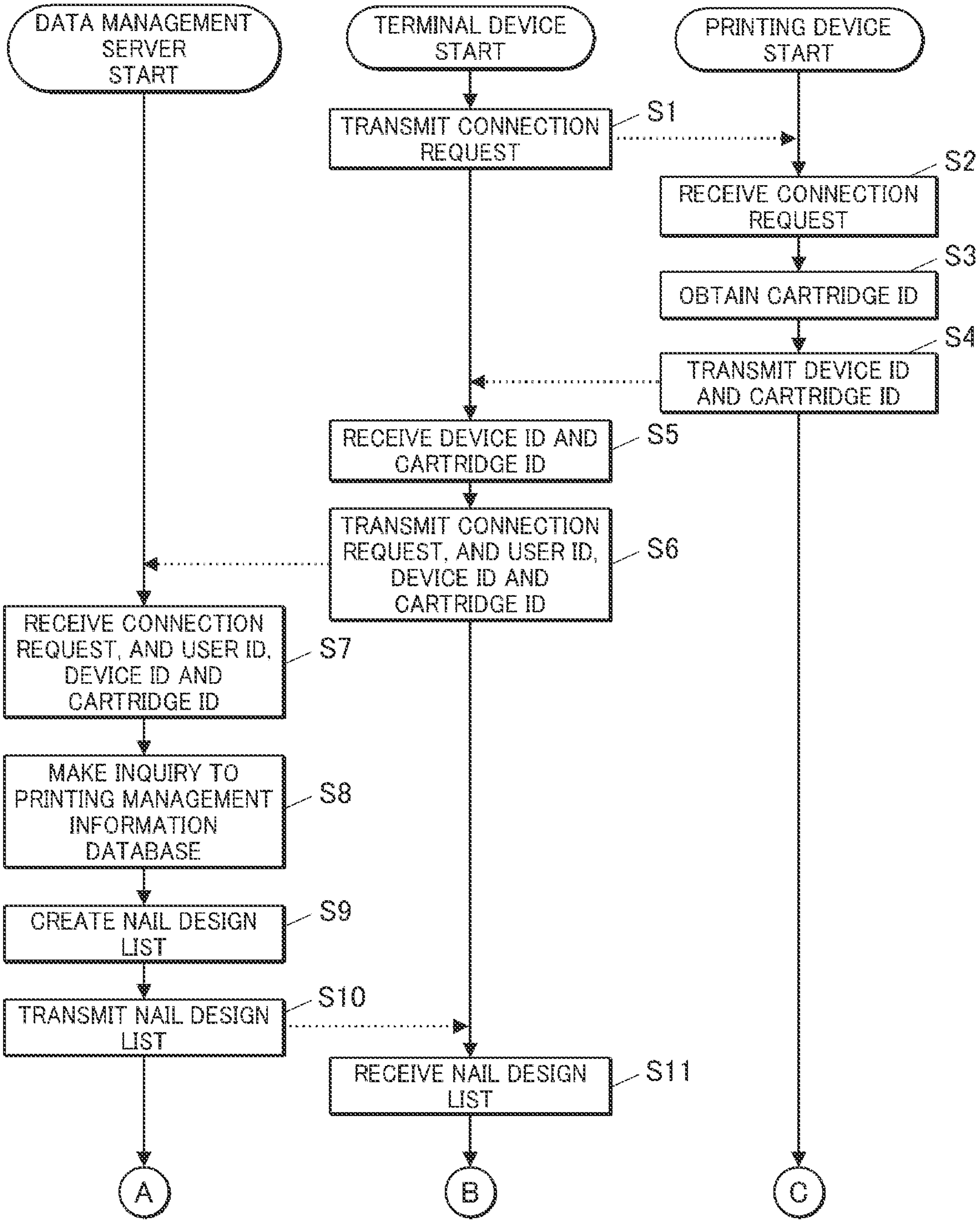
FIG. 9 is a flowchart showing printing control processing realized by the printing device, terminal device, and data management server which cooperate with each other in the embodiment.
Figure 10:
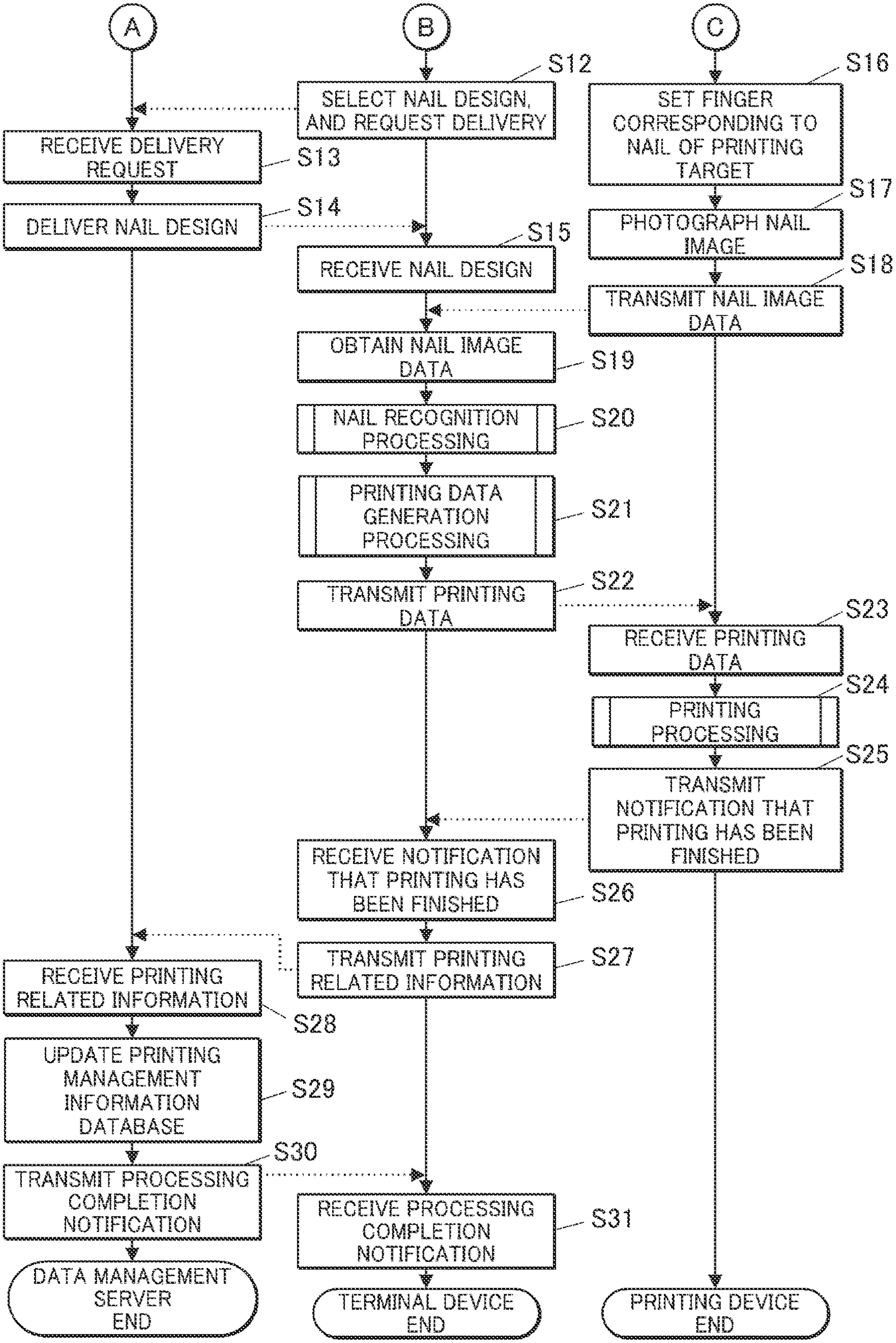
FIG. 10 is a flowchart showing design presenting processing and printing control processing realized by the printing device, terminal device, and data management server which cooperate with each other in the embodiment.

FIGS. 9 and 10 are flowcharts showing the design presenting processing and the printing control processing including the design presenting processing.

When the nail printing is performed by using the printing device 1 in the embodiment, the user operates the operation unit 22 (operation button) and the like of the printing device 1 to turn on and activate the printing device 1, and also turns on the terminal device 7 and selects the execution of nail print processing from the operation unit 73 of the terminal device 7. This activates the nail print application 721.

As shown in FIG. 9, the controller 71 of the terminal device 7 transmits the connection request (cooperation request) to the printing device 1 (step S1), and the printing device 1 receives this request (step S2).

In the embodiment, when the printing device 1 and the terminal device 7 are activated, the user can perform the input operation of selecting and setting the print mode from the operation unit and the like of the terminal device 7 or the printing device 1.

When any of the "normal print mode" and "eco mode" is selected as the print mode, the controller 11 of the printing device 1 causes the reader 48 to read the bar code and the like of the cartridge 41 which is currently set in the printing mechanism 4, and obtains the cartridge ID (step S3).

The controller 11 of the printing device 1 transmits the device ID of itself and the read cartridge ID to the terminal device 7 which has transmitted the connection request (step S4).

When the terminal device 7 receives the device ID and the cartridge ID (step S5), the controller 71 transmits the connection request and the device ID and the cartridge ID received from the printing device to the data management server 8 (step S6). At this time, the controller 71 may transmit the user ID and the like of the terminal device 7 together to the data management server 8.

When the data management server 8 receives the connection request from the terminal device 7, the data management server 8 accepts this and receives the device ID and the cartridge ID (step S7).

When the "eco mode" is selected as the print mode, the controller 81 of the data management server 8 makes an inquiry to the printing management information database 822 (step S8), and creates the nail design list by referring to the printing management information corresponding to the transmitted cartridge ID (step S9).

To be specific, the controller 81 estimates the ink remaining amount for each of cyan ink, magenta ink, and yellow ink in the cartridge 41, and the remaining amount balance of the inks from the printing management information stored in the printing management information database 822. The controller 81 then lists up recommended nail designs from the nail design database 823 on the basis of the estimation result, creates the nail design list and transmits the created nail design list to the terminal device 7, the transmitter of the connection request (step S10, design presenting processing).

When the "normal print mode" is selected as the print mode, the controller 81 of the data management server 8 does not make an inquiry to the printing management information database 822. For example, the controller 81 extracts the nail designs which were selected in the past by the user identified by the user ID, the designs close to them, and the like from the nail design database 823, lists the designs, and transmits the created nail design list to the terminal device 7 which is the transmitter of the connection request.

Figure 11:
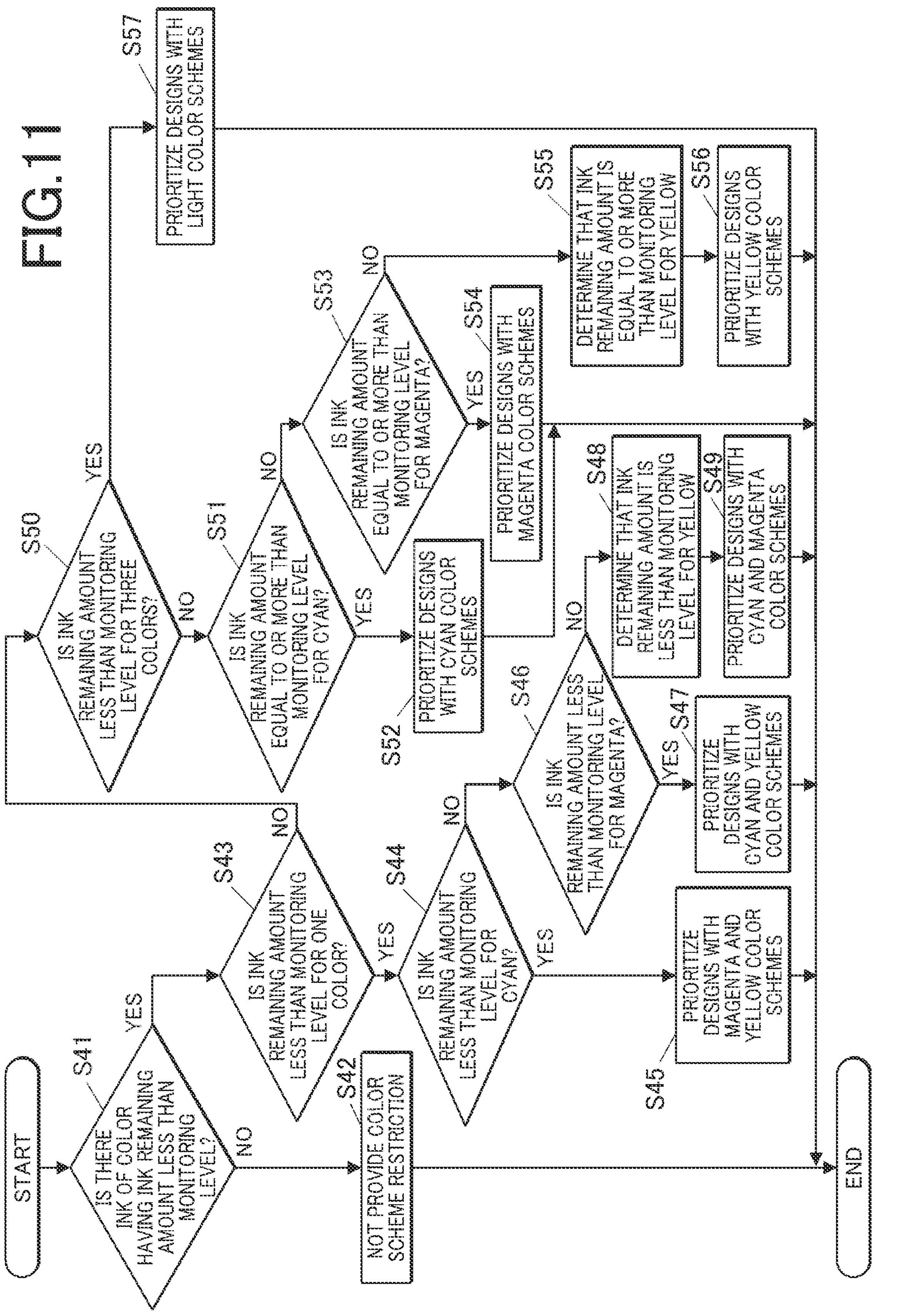
FIG. 11 is a flowchart showing nail design list creation processing in the embodiment.

The creation of nail design list in the design presenting processing when the "eco mode" is selected will be described in detail with reference to FIGS. 11 and 12.

When the controller 81 of the data management server 8 performs the design presenting processing, the controller 81 determines whether there is an ink of a color having the ink remaining amount less than a monitoring level, from the information on the ink remaining amount of each ink stored in the printing management information database 822 (step S41).

Figure 12:
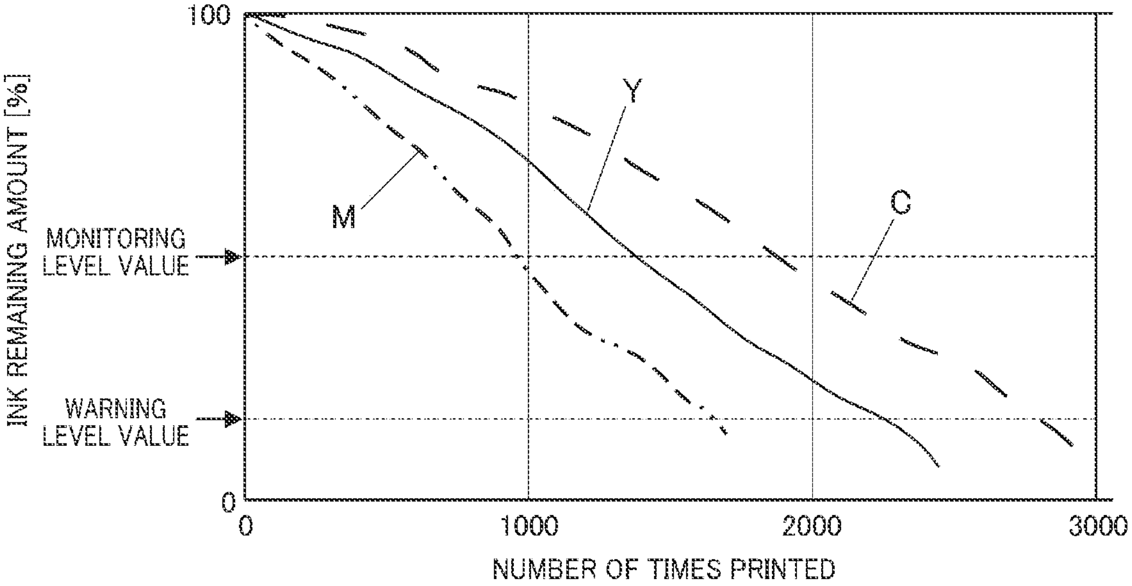
FIG. 12 is a graph showing the relationship between the number of times printed and the change in ink remaining amount.

As shown in the graph of FIG. 12, the remaining amount of ink stored in the cartridge 41 decreases as the number of times printed using the cartridge 41 increases. The degree of threshold of the monitoring level is set as appropriate. For example, in the example shown in FIG. 12, the controller 81 determines the ink remaining amount as the monitoring level when the ink remaining amount becomes approximately 50 to 30% of the initial state (that is, the state of 0 times printed). In FIG. 11, the controller 81 makes determination by whether the ink remaining amount is less than the monitoring level. However, for example, when the ink remaining amount is exactly 50% to determine the monitoring level, the controller 81 may treat the ink remaining amount of 50% as being the monitoring level (that is, step S41; YES), or the controller 81 may treat the ink remaining amount of 50% as not being the monitoring level (that is, step S41; NO).

As a result of inquiry to the printing management information database 822, if there is no color having the ink remaining amount of the monitoring level (step S41; NO), the controller 81 decides not to provide the color scheme restriction on the nail designs to be presented (step S42). In this case, even when the "eco mode" is selected as the print mode, the processing similar to the processing of "normal print mode" may be performed, for example, listing in order the nail designs which were selected in the past by the user identified by the user ID, the designs close to the nail designs, and the like.

On the other hand, if there is an ink having the ink remaining amount of the monitoring level (step S41; YES), the controller 81 determines whether the ink remaining amount is less than the monitoring level for one color (step S43).

If the ink remaining amount is less than the monitoring level only for one color (step S43; YES), the controller 81 further determines whether the ink remaining amount is less than the monitoring level for cyan (step S44). If the ink remaining amount is less than the monitoring level only for cyan (step S44; YES), the controller 81 creates the nail design list prioritizing the designs (nail designs) with magenta (M) and yellow (Y) color schemes (step S45).

On the other hand, if the ink remaining amount is less than the monitoring level not for cyan (step S44; NO), the controller 81 further determines whether the ink remaining amount is less than the monitoring level for magenta (step S46). For example, in the example shown in the graph of FIG. 12, only the ink remaining amount for magenta (M) is less than the monitoring level at the time point when printing is performed approximately 1000 times. If the ink remaining amount is less than the monitoring level only for magenta as in this case (step S46; YES), the controller 81 creates the nail design list prioritizing the designs (nail designs) with cyan (C) and yellow (Y) color schemes (step S47).

On the other hand, if the ink remaining amount is less than the monitoring level not for magenta (step S46; NO), the controller 81 determines that the ink remaining amount is less than the monitoring level only for yellow (step S48), and creates the nail design list prioritizing the designs (nail designs) with cyan (C) and magenta (M) color schemes (step S49).

On the other hand, if the ink remaining amount is less than the monitoring level not only for one color (step S43; NO), the controller 81 further determines whether the ink remaining amount is less than the monitoring level for three colors (step S50). If the ink remaining amount is less than the monitoring level not for three colors (step 550; NO), the controller 81 determines whether the ink remaining amount is equal to or more than the monitoring level for cyan (step S51). For example, in the example shown in the graph of FIG. 12, the ink remaining amounts for other than cyan (C) is less than the monitoring level at the time point when printing is performed nearly 1500 times. If the ink remaining amount is equal to or more than the monitoring level only for cyan as in this case (step S51; YES), the controller 81 creates the nail design list prioritizing the designs (nail designs) with cyan (C) color schemes (step S52).

On the other hand, if the ink remaining amount is equal to or more than the monitoring level not for cyan (step S51; NO), the controller 81 further determines whether the ink remaining amount is equal to or more than the monitoring level for magenta (step S53). If the ink remaining amount is equal to or more than the monitoring level only for magenta (step S53; YES), the controller 81 creates the nail design list prioritizing the designs (nail designs) with magenta (M) color schemes (step S54). If the ink remaining amount is equal to or more than the monitoring level not for magenta (step S53; NO), the controller 81 determines that the ink remaining amount is equal to or more than the monitoring level for yellow (Y) (step S55), and creates the nail design list prioritizing the designs (nail designs) with yellow (Y) color schemes (step S56).

The order of the colors for which the ink remaining amount is determined and the like are not limited to the example described here.

On the other hand, if the ink remaining amount is less than the monitoring level for three colors (step S50; YES), the controller 81 creates the nail design list prioritizing the designs (nail designs) with light color schemes for all the colors (step S57). For example, in the example shown in the graph of FIG. 12, the ink remaining amounts for all the colors are less than the monitoring level at the time point when printing is performed nearly 2000 times. In such a case, the designs (nail designs) composed with the light color schemes are recommended.

When listing many nail designs on the nail design list, the lower end of the list may contain designs which are not necessarily recommended in light of the remaining ink status. However, when the user performs input selecting such a nail design, the design is selected as the nail design to be printed.

When the ink remaining amount becomes less than the threshold of the warning level, there is a possibility that the stable print results cannot be maintained. If the inks can be replaced for each one color, the replacement of the ink of the color concerned may be urged. However, in the embodiment, the ink reservoirs of all the color inks are integrally provided in one cartridge 41 as mentioned above. Thus, when there is an ink which exceeds the warning level threshold even for one color, it is preferable to cause the display unit 23 of the printing device 1, the display unit 74 of the terminal device 7, and the like to display the warning message and the like urging the user to replace the cartridge 41. The degree of the threshold of warning level is set as appropriate. For example, when the ink remaining amount becomes approximately several percent of the initial state (that is, the state of 0 times printed), the controller 81 determines that the ink remaining amount is the warning level. How to treat the case where the ink remaining amount level becomes equal to the threshold is similar to that described for the threshold of monitoring level, and thus the explanation thereof is omitted.

As described above, when the nail design list is created in the data management server 8 (step S9 in FIG. 9), the list is transmitted to the terminal device 7 (step S10 in FIG. 9), and the terminal device 7 receives the list (step S11 in FIG. 9), the list of nail designs and the like based on the nail designs list is displayed on the display unit 23 of the printing device 1, the display unit 74 of the terminal device 7 and the like. When the user selects a desired nail design from the list, and inputs the selection instruction from the operation units 22 and 73 and the like, as shown in FIG. 10, the nail design is selected, and the delivery request requesting to deliver the data of the nail design is transmitted from the terminal device 7 to the data management server 8 (step S12).

Figure 6:
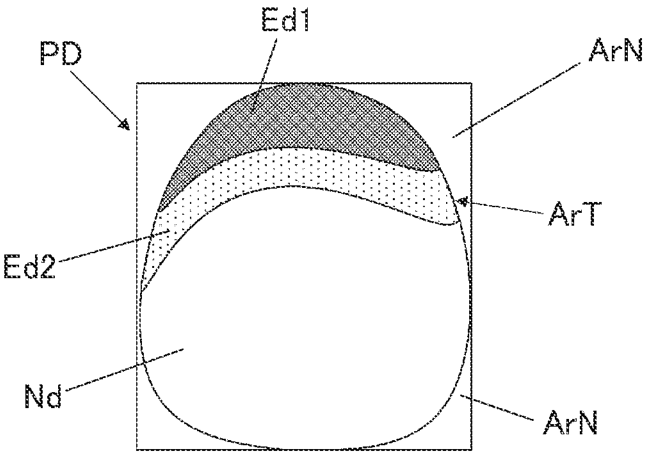
FIG. 6 is a view showing an example of an image of original printing data.

When the delivery request is received from the terminal device 7 (step S13), the controller 81 of the data management server 8 delivers the requested data of nail design (rectangular original printing data PD as shown in FIG. 6) to the terminal device 7 (step S14), and the delivered data is received in the terminal device 7 (step S15).

In the printing device 1, the finger U corresponding to the nail T which is the printing target is set in the finger stage 3 (step S16), and the nail image is photographed by the photographing unit 5 (step S17). The data of the photographed nail image is transmitted to the terminal device 7 (step S18).

When the nail image is obtained from the printing device 1 (step S19), the controller 71 of the terminal device 7 performs the nail recognition processing of recognizing the region of nail T on the basis of the nail image (step S20). The controller 71 then fits the original printing data PD of the nail design delivered from the data management sever 8 to the nail T region of the user, and generates the printing data by performing necessary corrections such as curved surface correction as appropriate (step S21).

The generated printing data is transmitted to the printing device 1 from the terminal device 7 (step S22), and the printing processing based on the printing data is performed in the printing device 1 which received (step S23) the printing data (step S24). When the printing processing has been finished, the notification that the printing has been finished is transmitted from the printing device 1 to the terminal device 7 (step S25). When the notification that the printing has been finished is received from the printing device 1 (step S26), the controller 71 of the terminal device 7 transmits the "printing related information" regarding the printing processing which was performed in the printing device 1 to the data management sever 8 (step S27).

The data management server 8 which received the "printing related information" (step S28) rewrites the contents stored in the printing management information database 822 to update them to the latest state, by using the information necessary for calculating the ink remaining amount such as the number of print dots of the ink for each color in the printing processing (step S29). When the update processing has been completed, the data management server 8 transmits the processing completion notification to the terminal device 7 (step S30). When the terminal device 7 receives the processing completion notification from the data management server 8 (step S31), the controller 71 of the terminal device 7 determines whether the printing has been finished for the nails T of all the fingers U which are planned to be printed. If there is a nail T which has not yet been printed, the processing returns to step S16 to set the finger U corresponding to the nail, and the following processes are repeated.

On the other hand, when the printing has been finished for the nails T of all the fingers U which are planned to be printed, a series of processing ends.

As described above, according to the embodiment, the controller 81 of the data management server 8 which is the electronic equipment obtains the "ink information", and selects (presents) the designs on the basis of the "ink information".

By this, it is possible to change how to present the nail designs according to the status of the inks stored in the cartridge 41 of the printing device 1, which enables effective use of the inks in the cartridge 41.

The "ink information" in the embodiment includes the "information regarding a percentage of an ink remaining amount" for each of the first ink and the second ink which has a color different from the color of the first ink in the cartridge 41 as the print head which ejects the first ink and the second ink.

In this way, in the embodiment, it is possible to change how to present the nail design according to the ink remaining amount (percentage of the ink remaining amount) for each color ink stored in the cartridge 41 of the printing device 1. By this, it is possible to present (suggest), to the user, designs which allow to prevent the bias in the ink remaining amount for each color ink in the cartridge 41, to use the inks of respective colors in as balanced a manner as possible, and to use up the inks with as little waste as possible.

Thus, it is possible to extend the service life of the cartridge 41, reduce the replacement frequency of cartridge 41 and reduce the waste. Furthermore, it is possible to reduce the frequency of maintenance of the printing device 1 due to waiting for replacement of the cartridge 41 or the replacement work.

In the embodiment, the controller 81 specifies the color to be used with priority for the design on the basis of the "information regarding a percentage of an ink remaining amount", and presents the designs on the basis of the specified color.

Thus, it is possible to change how to present the nail designs according to the ink remaining amount (percentage of the ink remaining amount). By this, it is possible to suggest, to the user, designs which allow to prevent the bias in the ink remaining amount in the cartridge 41, to use the inks of respective colors in as balanced a manner as possible, and to use up the inks of all the colors as much as possible.

In the embodiment, a threshold is set in advance for the ink remaining amount (percentage of the ink remaining amount). When there is an ink having the ink remaining amount less than the threshold, the controller 81 specifies the color other than the color of the ink as the color to be used with priority for the design.

Since the threshold is set in advance in this way, it is possible to clearly determine which color of ink is to be used with priority, and suggest, to the user, the designs which allow to use up the inks in the cartridge 41 with as little bias as possible.

Though the embodiment of the present disclosure has been described above, the present disclosure is not limited to such embodiment, and various modifications can be made within the scope of the present disclosure.

The above embodiment assumes the case where the terminal device 7 is a mobile terminal such as a smartphone owned by the user. However, the terminal device 7 is not limited to the device owned by the user. In addition, the terminal device 7 does not have to be a separate device from the printing device 1. For example, the terminal device 7 can be an operation terminal attached to the printing device 1.

Although several embodiments of the present disclosure have been described, the scope of the present disclosure is not limited to the above described embodiments and includes the scope of the present disclosure that is described in the claims and the equivalents thereof.

What is claimed is:

1. An electronic equipment comprising:

a memory in which a program and multiple types of design data including color scheme information are stored, the color scheme information indicating a percentage of a first ink or a second ink used, and the second ink having a color different from a color of the first ink; and at least one processor that executes the program stored in the memory, wherein the processor obtains ink information including information regarding a percentage of an ink remaining amount for each of the first ink and the second ink in a print head that prints the first ink and the second ink, and selects printing design data from among the multiple types of design data based on the ink information and the color scheme information.

2. The electronic equipment according to claim 1, wherein the processor specifies a color to be used with a priority for a design based on the information regarding the percentage of the ink remaining amount, and selects the printing design data based on the specified color.

3. The electronic equipment according to claim 2, wherein a threshold is set in advance for the percentage of the ink remaining amount, and the processor specifies a color other than a color of an ink that has an ink remaining amount less than the threshold, as the color to be used with the priority for the design.

4. A design selecting method comprising:

storing multiple types of design data including color scheme information, the color scheme information indicating a percentage of a first ink or a second ink used, and the second ink having a color different from a color of the first ink;

obtaining ink information including information regarding a percentage of an ink remaining amount for each of the first ink and the second ink in a print head that prints the first ink and the second ink; and selecting printing design data from among the multiple types of design data based on the obtained ink information and the color scheme information.

5. The design selecting method according to claim 4, wherein a color to be used with a priority for a design is specified based on the information regarding the percentage of the ink remaining amount, and the printing design data is selected based on the specified color.

6. The design selecting method according to claim 5, wherein a threshold is set in advance for the percentage of the ink remaining amount, and a color other than a color of an ink that has an ink remaining amount less than the threshold is specified as the color to be used with the priority for the design.

7. A non-transitory computer readable storage medium storing a program that causes a computer to perform:

storing multiple types of design data including color scheme information, the color scheme information indicating a percentage of a first ink or a second ink used, and the second ink having a color different from a color of the first ink;

obtaining ink information including information regarding a percentage of an ink remaining amount for each of the first ink and the second ink in a print head that prints the first ink and the second ink, and selecting printing design data from among the multiple types of design data based on the obtained ink information and the color scheme information.

8. The storage medium according to claim 7, wherein the program causes the computer to specify a color to be used with a priority for a design based on the information regarding the percentage of the ink remaining amount, and select the printing design data based on the specified color.

9. The storage medium according to claim 8, wherein a threshold is set in advance for the percentage of the ink remaining amount, and the program causes the computer to specify a color other than a color of an ink that has an ink remaining amount less than the threshold, as the color to be used with the priority for the design.

* * * * *